US012565343B2

(12) United States Patent (10) Patent No.: US 12,565,343 B2
Ha et al. (45) Date of Patent: Mar. 3, 2026

(54) METHOD, APPARATUS, AND SYSTEM FOR SUPPLYING POWER DURING TAKEOFF AND LANDING OF UAM AIRCRAFT

(71) Applicants: HYUNDAI MOTOR COMPANY, Seoul (KR); KIA CORPORATION, Seoul (KR)

(72) Inventors: Dong Hyun Ha, Seoul (KR); Jung Hun Choi, Hwaseong-si (KR); Jae Wung Jung, Bucheon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 412 days.

(21) Appl. No.: 18/105,982

(22) Filed: Feb. 6, 2023

(65) Prior Publication Data

US 2024/0076070 A1 Mar. 7, 2024

(30) Foreign Application Priority Data

Sep. 1, 2022 (KR) ........................ 10-2022-0110575

(51) Int. Cl.
| | |
|---|---|
| *B64U 50/34* | (2023.01) |
| *B60L 53/35* | (2019.01) |
| *B60L 53/60* | (2019.01) |
| *B60L 53/65* | (2019.01) |
| *B64C 39/02* | (2023.01) |
| *B64U 10/60* | (2023.01) |
| *B64U 50/37* | (2023.01) |

(Continued)

(52) U.S. Cl.
CPC .............. *B64U 50/34* (2023.01); *B60L 53/35* (2019.02); *B60L 53/60* (2019.02); *B60L 53/65* (2019.02); *B64C 39/022* (2013.01); *B64U 10/60* (2023.01); *B64U 50/37* (2023.01); *B64U 70/20* (2023.01); *B64U 70/97* (2023.01); *B64U 70/99* (2023.01); *B64U 80/25* (2023.01); *B64U 2101/00* (2023.01); *B64U 2101/25* (2023.01)

(58) Field of Classification Search
None
See application file for complete search history.

(56) References Cited

U.S. PATENT DOCUMENTS

| | | | | |
|---|---|---|---|---|
| 2016/0144982 A1* | 5/2016 | Sugumaran | ............. | B64F 1/005 |
| | | | | 244/108 |
| 2017/0158354 A1* | 6/2017 | Bourne | .................. | B64D 27/24 |

(Continued)

*Primary Examiner* — Bryce P Bonzo
(74) *Attorney, Agent, or Firm* — Lempia Summerfield Katz LLC

(57) ABSTRACT

A method, apparatus, and system for supplying power during the takeoff and landing of an Urban Air Mobility (UAM) aircraft is disclosed herein. A power supplying method is performed by a power supply system comprising a drone and a hub. The power supplying method includes: determining whether power is required for an Urban Air Mobility (UAM) aircraft to land on the hub using battery information of the UAM aircraft when the UAM aircraft is determined to be in a landing mode; moving the drone from the hub to the UAM aircraft using location information of the UAM aircraft when it is determined that power is additionally required for the UAM aircraft to land on the hub; docking the drone to the UAM aircraft to couple with; and supplying power required for the UAM aircraft to land on the hub to the UAM aircraft by the drone.

14 Claims, 10 Drawing Sheets

(51) Int. Cl.

| | |
|---|---|
| *B64U 70/20* | (2023.01) |
| *B64U 70/97* | (2023.01) |
| *B64U 70/99* | (2023.01) |
| *B64U 80/25* | (2023.01) |
| *B64U 101/00* | (2023.01) |
| *B64U 101/25* | (2023.01) |

(56)                    References Cited

U.S. PATENT DOCUMENTS

| | | | | |
|---|---|---|---|---|
| 2019/0047701 A1* | 2/2019 | Winkle | .................... | H02J 7/342 |
| 2021/0147074 A1* | 5/2021 | Crowley | ................ | B64U 70/90 |
| 2021/0237606 A1* | 8/2021 | McNair | ................. | B64D 41/00 |
| 2022/0223056 A1* | 7/2022 | Dupray | ............. | H04B 7/18506 |

* cited by examiner

METHOD, APPARATUS, AND SYSTEM FOR SUPPLYING POWER DURING TAKEOFF AND LANDING OF UAM AIRCRAFT

CROSS-REFERENCE TO RELATED APPLICATIONS

The present application claims the benefit of and priority to Korean Patent Application Number 10-2022-0110575, filed on Sep. 1, 2022 in the Korean Intellectual Property Office, the entire disclosure of which is incorporated herein by reference.

TECHNICAL FIELD

The present disclosure relates to a method, apparatus, and system for supplying power during the takeoff and landing of an Urban Air Mobility (UAM) aircraft. More particularly, the present disclosure relates to a method and apparatus in which a drone supplies power to an UAM aircraft using an UWB sensor while the UAM aircraft is taking off and landing.

BACKGROUND

The content described below merely provides background information on the present embodiment and does not constitute the prior art.

UAM (Urban Air Mobility) is a next-generation, three-dimensional urban air traffic system that connects ground and air, allowing transportation of people and cargo over the city. As the UAM becomes more popularized, it will introduce to the public new means of transportation in a city and reduce the traffic congestion issues in implemented areas. Moreover, by diverting some of the traffic from ground to air, UAM will also allow some of the areas in cities that were previously dedicated to supporting ground-based transportation 13 such as roads or parking lots—to be freed and developed for better purposes.

With the increased use of aircrafts, the degree of risk that may occur in the aircraft may potentially increase. Thus, it is desired to ensure the flight distance of the aircraft for successful commercialization of UAM. One aspect of the UAM is that an UAM aircraft typically performs vertical take-off and landing rather than conventional take-off and landing that utilizes runways due to horizontal space constraints in cities. However, when an UAM aircraft performs vertical take-off and landing, a lot of energy is consumed, which produces undesirable side effect of reducing the vehicle's range. Another issue that arises is that there is a risk of accident happening due to the UAM aircraft not having enough power to properly land when it arrives at the destination, as amount of power needed to perform a vertical landing may vary. One way to mitigate these issues is to have a drone to form an Ultra WideBand (UWB)-based link with the UAM aircraft and to supply power to the UAM aircraft during the vertical take-off and landing procedure.

SUMMARY

A power supplying method according to the present disclosure is a power supplying method performed by a power supply system comprising a drone and a hub. The power supplying method comprises: determining whether power is required for an Urban Air Mobility (UAM) vehicle (e.g., UAM aircraft) to land on the hub using battery information of the UAM vehicle when the UAM vehicle is determined to be in a landing mode; moving the drone from the hub to the UAM vehicle using location information of the UAM vehicle when it is determined that power is additionally required for the UAM vehicle to land on the hub; docking the drone with the UAM vehicle to be coupled to the UAM vehicle; and supplying power required for the UAM vehicle to land on the hub to the UAM vehicle by the drone. In particular, battery information of the UAM vehicle is acquired by an UWB-based link formed between the hub and the UAM vehicle, the location information of the UAM vehicle is acquired by the UWB-based link formed between the hub and the UAM vehicle and a UWB-based link formed between the drone and the UAM vehicle, and the drone is connected to the hub via a cable.

A power supplying method according to one embodiment of the present disclosure is a power supplying method performed by a power supply system comprising a drone and a hub. The power supplying method comprises: docking the drone to the UAM vehicle to couple with when the UAM vehicle is determined to be in a takeoff mode; supplying power required for the takeoff to the UAM vehicle through the drone, and separating the drone from the UAM vehicle to move the drone away when the UAM vehicle reaches a predetermined height. In particular, battery information of the UAM vehicle is acquired by an UWB-based link formed between the hub and the UAM vehicle, and the drone is connected to the hub via a cable.

According to another embodiment of the present disclosure, a power supply system comprises: a memory and a plurality of processors, wherein at least one of the plurality of processors determines whether power is required for a UAM vehicle to land on the hub using battery information of the UAM vehicle when the UAM vehicle is determined to be in a landing mode; moves the drone from the hub to the UAM vehicle using location information of the UAM vehicle, when it is determined that power is additionally required for the UAM vehicle to land on the hub; docks the drone to the UAM vehicle to couple with; and supplies power required for the UAM vehicle to land on the hub to the UAM vehicle by the drone. In particular, the battery information of the UAM vehicle is acquired by a UWB-based link formed between the hub and the UAM vehicle, the location information of the UAM vehicle is acquired by the UWB-based link formed between the hub and the UAM vehicle and a UWB-based link formed between the drone and the UAM vehicle, and the drone is connected to the hub via a cable.

According to one embodiment of the present disclosure, a power supply system comprises: a memory and a plurality of processors. In particular, at least one of the plurality of processors is configured to: dock the drone to the UAM vehicle to couple with when the UAM vehicle is determined to be in a takeoff mode, supply power required for takeoff of the UAM vehicle to the UAM vehicle by using the drone, and separate the drone from the UAM vehicle to move away the drone when the UAM vehicle reaches a predetermined height. To be more specific, the battery information of the UAM vehicle is acquired by a UWB-based link formed between the hub and the UAM vehicle, and the drone is connected to the hub via a cable.

DETAILED DESCRIPTION

Figure 1:
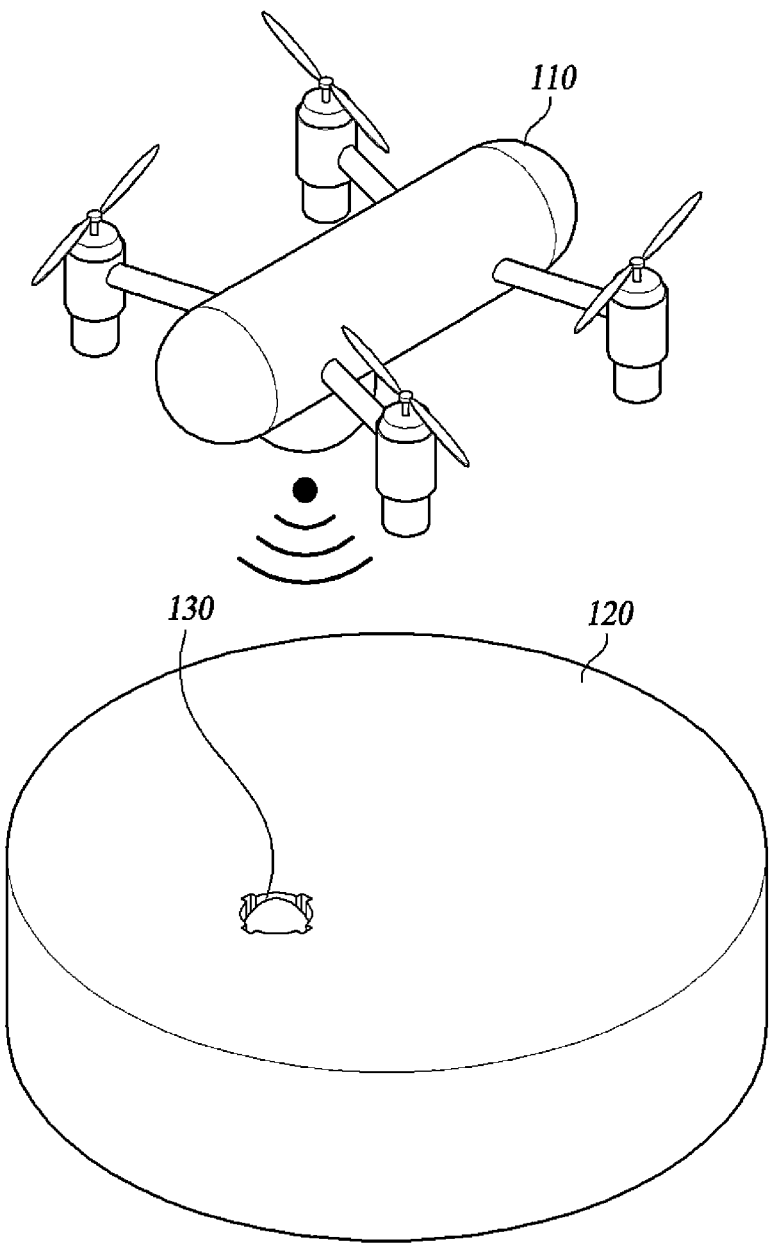
FIG. 1 is a diagram illustrating an Urban Air Mobility (UAM) aircraft and a hub according to an embodiment of the present disclosure.

The present disclosure is to provide a method, apparatus, and system, in which a drone installed in a hub supplies power to an UAM aircraft while the UAM aircraft is taking off and landing.

Furthermore, the present disclosure is to provide a method, apparatus, and system, which increase the State of Health (SOH) and lifespan of an UAM aircraft battery.

Furthermore, the present disclosure is to provide a method, apparatus, and system, which increase the flight distance of an UAM aircraft.

Furthermore, the present disclosure is to provide a method, apparatus, and system, in which an UAM aircraft and a drone form an UWB-based link and prevent hacking.

Furthermore, the present disclosure is to provide a method, apparatus, and system, in which a charging cable mounted on a drone is extended or reduced by adjusting tension.

Furthermore, the present disclosure is to provide a method, apparatus, and system, which increase the durability of a hub through drainage treatment.

Furthermore, the present disclosure is to provide a method, apparatus, and system, in which the degree of freedom in angle or direction is high when a drone and an UAM aircraft are connected, thus allowing power to be stably supplied.

The objectives to be achieved by the present disclosure are not limited to the above-mentioned objectives, and other objectives which are not mentioned will be clearly understood by those skilled in the art from the following description.

Hereinafter, some embodiments of the present disclosure are described in detail with reference to the accompanying drawings. In the following description, like reference numerals preferably designate like elements, although the elements are shown in different drawings. Further, in the following description of some embodiments, a detailed description of known functions and configurations incorporated therein are omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

When a component, device, element, or the like of the present disclosure is described as having a purpose or performing an operation, function, or the like, the component, device, or element should be considered herein as being "configured to" meet that purpose or to perform that operation or function.

The following detailed description, together with the accompanying drawings, is intended to describe exemplary embodiments of the present disclosure, and is not intended to represent the only embodiments in which the present disclosure may be practiced.

FIG. 1 is a diagram illustrating an Urban Air Mobility (UAM) aircraft and a hub according to an embodiment of the present disclosure. Electric Vertical Take-off and Landing (E-VTOL) is a technology in which an aircraft vertically takes off and lands using electrical power. The UAM vehicle may have the same meaning as the UAM aircraft. In the present disclosure the UAM vehicle may be used interchangeably with UAM aircraft. The hub may correspond to the transfer point of the UAM aircraft. When the UAM aircraft vertically takes off using E-VTOL, the UAM aircraft consumes about 7.5% of the total energy. When the UAM aircraft vertically lands using E-VTOL, the UAM aircraft consumes about 19.5% of the total energy. That is, about 27% of the total energy is consumed for the UAM aircraft to land on or take off from the hub using E-VTOL. Power may be supplied not only when the UAM aircraft stops at the hub but also during takeoff and landing. If power is supplied while the UAM aircraft is taking off or landing, the flight distance of the UAM aircraft may be increased by up to approximately 37%. Thus, the State of Charge (SOC) and State of Health (SOH) of the UAM aircraft battery may be increased. A drone mounted on the hub may form an Ultra WideBand (UWB) link with the UAM aircraft. When the UAM aircraft takes off from the hub or lands on the hub, the drone may check the location of the UAM aircraft using the UWB and supply power to the UAM aircraft. The UAM aircraft and the drone may include one or more UWB sensors.

Referring to FIG. 1, the UAM aircraft 110 may take off from the hub 120 or land on the hub 120. The hub 120 may include a drone 130. The UAM aircraft 110, the hub 120, and the drone 130 may include at least one or more UWB sensors. The UAM aircraft 110, the hub 120, and the drone 130 may mutually form the UWB-based link. The hub 120 and the drone 130 may recognize the location of the UAM aircraft 110 using the UWB-based link. The hub 120 and the drone 130 may exchange information with the UAM aircraft 110 or perform security authentication. The UAM aircraft 110 may also recognize the location of the hub 120 and the drone 130 using the UWB-based link. The UAM aircraft 110 may exchange information with the hub 120 and the drone 130 or perform security authentication. An external hacking attack by an attacker may be prevented through the security authentication.

The hub 120 may recognize from the flight information of the UAM aircraft 110 whether the UAM aircraft 110 is performing take-off or landing and the power requirement for the action being performed. The hub 120 may determine the takeoff mode and the landing mode of the UAM aircraft 110 from the flight information of the UAM aircraft 110. When the UAM aircraft 110 stops at the hub 120, the hub 120 may charge the UAM aircraft 110 using the drone 130. The hub 120 may calculate a required power amount using the SOC and SOH of the battery of the UAM aircraft 110 and the flight information of the UAM aircraft.

Figure 2:
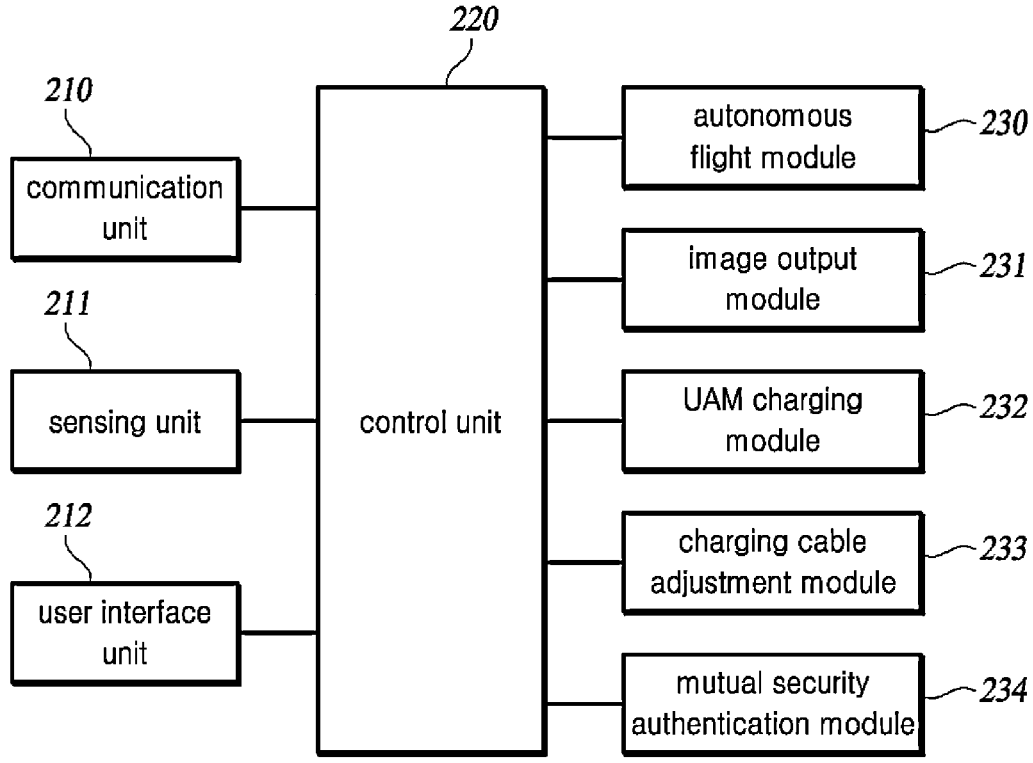
FIG. 2 is a diagram illustrating a control device mounted on the hub according to an embodiment of the present disclosure.

FIG. 2 is a diagram illustrating a control device mounted on the hub according to an embodiment of the present disclosure.

Referring to FIG. 2, the hub may include a communication unit 210, a sensing unit 211, a user interface unit 212, a control unit 220, an autonomous flight module 230, an image output module 231, an UAM charging module 232, a charging cable adjustment module 233, and a mutual security authentication module 234. The communication unit 210 may transmit and receive information to and from the drone and the UAM aircraft through a communication network. The communication unit 210 may transmit and receive information to and from the drone and the UAM aircraft through at least one communication method of LAN (Wireless LAN), Wi-Fi (Wireless-Fidelity), Wi-Fi (Wireless Fidelity) Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), and LTE-A (Long Term Evolution-Advanced).

Furthermore, the communication unit 210 may perform short-range communication with the drone and the UAM aircraft. The communication unit 210 may transmit and receive information to and from the drone and the UAM aircraft through short-range wireless communication. In this case, the communication unit 210 may transmit and receive information to and from the drone and the UAM aircraft through Bluetooth, RFID (Radio Frequency Identification), Infrared Data Association (IrDA), UWB (Ultra WideBand), ZigBee, NFC (Near Field Communication), Wi-Fi (Wireless-Fidelity), Wi-Fi Direct, Wireless USB (Wireless Universal Serial Bus), etc.

The sensing unit 211 may include a radar, a camera, a lidar, and the like. The sensing unit 211 may detect the speed and location of the drone and the UAM aircraft. The sensing unit 211 may detect all objects including obstacles, people, and animals as well as the drone and the UAM aircraft. The user interface unit 212 may provide a user interface to a manager in the hub. The user interface unit 212 may receive information from the manager in the hub and input the information into the control unit 220 or output a result according to an operation. For example, the manager in the hub may input information about the drone and the UAM aircraft into the user interface unit 212. Then the user interface unit 212 may input information about the drone and the UAM aircraft into the control unit 220. The control unit 220 may then give a control command to the autonomous flight module 230 using the information about the drone and the UAM aircraft.

The control unit 220 may control the autonomous flight module 230, the image output module 231, the UAM charging module 232, the charging cable adjustment module 233, and the mutual security authentication module 234 according to the information received from the communication unit 210, the sensing unit 211, and the user interface unit 212. The autonomous flight module 230 may change or maintain the speed and direction of the drone according to the control command of the control unit 220. The image output module 231 may output images of the drone and the UAM aircraft to the manager in the hub according to the control command of the control unit 220. The UAM charging module 232 may charge the UAM aircraft according to the control command of the control unit 220. The charging cable adjustment module 233 may adjust the length of a cable by adjusting the tension of the cable connected to the drone according to the control command of the control unit 220. The mutual security authentication module 234 may perform authentication using an identifier (ID) of the drone and the UAM aircraft, according to the control command of the control unit 220. The hub may defend against the hacking attack of an attacker through the authentication.

Figure 3A:
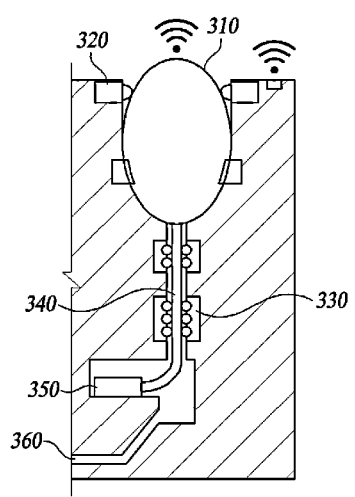
FIGS. 3A and 3B are diagrams illustrating the internal structure of the hub according to an embodiment of the present disclosure.
Figure 3B:
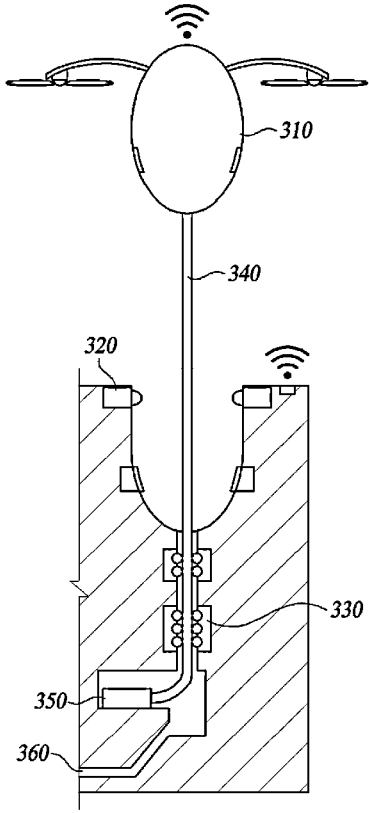

FIGS. 3A and 3B are diagrams illustrating the internal structure of the hub according to an embodiment of the present disclosure.

Referring to FIG. 3A, the hub may include a drone 310, a drone mounting unit 320, a linear ball bearing 330, a cable 340, an electric motor 350, and a drain pipe 360. The hub and the drone 310 may include at least one UWB sensor. The hub and the drone 310 may exchange information with the outside using the UWB sensor. The hub may receive the flight information of the UAM aircraft, the battery information of the UAM aircraft, the location information of the UAM aircraft, and the initial absolute location information of the UAM aircraft from the UAM aircraft using the UWB sensor. The flight information of the UAM aircraft may include the speed, location, positioning, and the required power amount of the UAM aircraft. The battery information of the UAM aircraft may include the SOC, SOH and charging requirement of the UAM aircraft battery. The hub may check the ID of the UAM aircraft using the UWB sensor to perform security authentication and calculate a distance to the UAM aircraft.

Before the UAM aircraft lands, the drone 310 may be installed in the hub. The drone may be installed in a cabin structure inside the hub. The drone mounting unit 320 may expand to fix the drone 310 in the hub. The linear ball bearing 330 may reduce friction generated when the cable 340 moves. The cable 340 may be connected to the lower end of the drone 310. The cable 340 may be connected to the electric motor 350. The electric motor 350 may supply power through the cable 340 to the drone 310. The electric motor 350 may adjust the tension of the cable 340 which may be adjusted in length by adjusting tension. When it rains or snows, the drain pipe 360 may discharge foreign substances and rainwater to the outside, improving the durability of the hub. When the UAM aircraft lands and stops at the hub, the drone 310 may be docked with the UAM aircraft and be coupled to it, thus rapidly or slowly charging the battery of the UAM aircraft.

Referring to FIG. 3B, when the UAM aircraft approaches the hub to land, the drone 310 may move from the hub to the UAM aircraft. The drone 310 may move from the hub to the UAM aircraft by contracting the drone mounting unit 320. As the drone 310 moves to the UAM aircraft, the length of the cable 340 connected to the lower end of the drone 310 may be increased. As the length of the cable 340 increases, the drone 310 may be efficiently docked with or undocked from the UAM aircraft. When the UAM aircraft takes off from the hub, the drone 310 may be coupled to the UAM aircraft and move while supplying power. When the UAM aircraft reaches a sufficient height, the drone may be automatically released from the UAM aircraft. After the drone is released, it may return to the hub by flying. Here, the drone may return to a correct location within the hub using the UWB. The returned drone may be mounted in the cabin structure in the hub.

Figure 4:
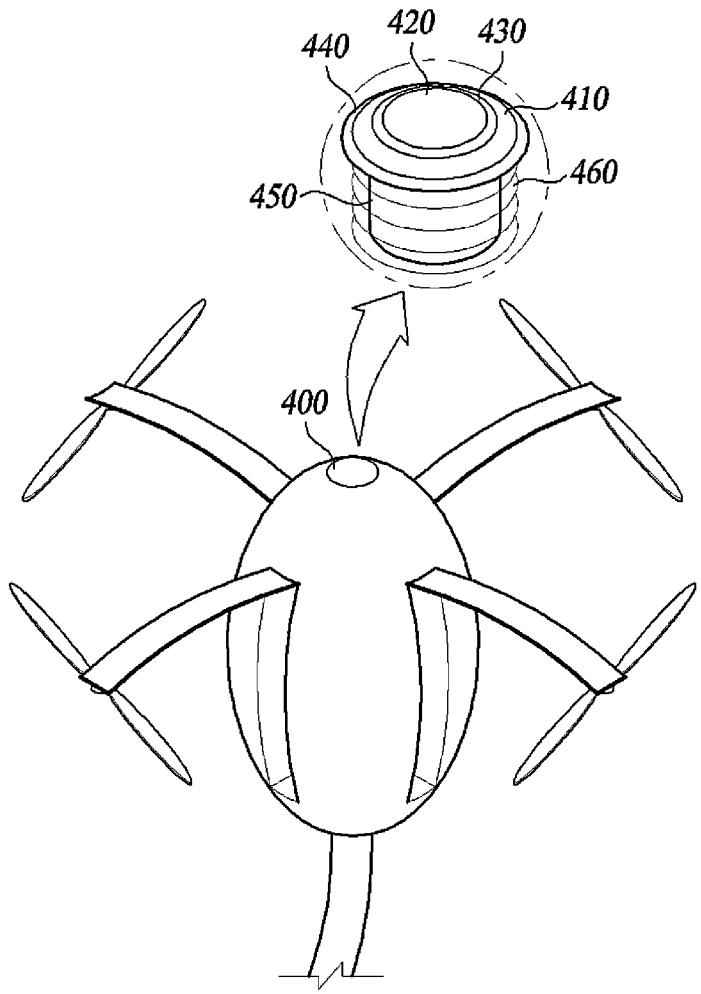
FIG. 4 is a diagram illustrating a charging-terminal connector of a drone according to an embodiment of the present disclosure.

FIG. 4 is a diagram illustrating a charging-terminal connector of the drone according to an embodiment of the present disclosure.

Referring to FIG. 4, when the charging-terminal connector 400 of the drone is enlarged, the charging-terminal connector 400 of the drone may include a negative charging plug 410, a positive charging plug 420, an isolator 430, an electronic buckle fastening/releasing unit 440, a charging cable 450, and a tube 460. The charging-terminal connector 400 of the drone may have a round shape while the charging connector of the UAM aircraft may have a recessed shape, letting the degree of freedom in angle or direction to be high when connecting the charging connector of the UAM aircraft and the charging-terminal connector 400 of the drone.

The negative charging plug 410 of the charging-terminal connector 400 of the drone may be connected to the positive charging plug of the charging connector of the UAM aircraft, while the positive charging plug 420 of the charging-terminal connector 400 of the drone may be connected to the negative charging plug of the charging connector of the UAM aircraft. The isolator 430 may block electricity and heat exchange between the negative charging plug 410 and the positive charging plug 420. The electronic buckle fastening/releasing unit 440 may fasten or release the charging cable 450 to or from the tube 460. The tube 460 surrounds the charging cable 450 to prevent dust or water from entering the charging cable 450.

FIG. 5 is a diagram illustrating a process in which the UAM aircraft lands vertically according to an embodiment of the present disclosure.

Figures 5A, 5B, 5C:
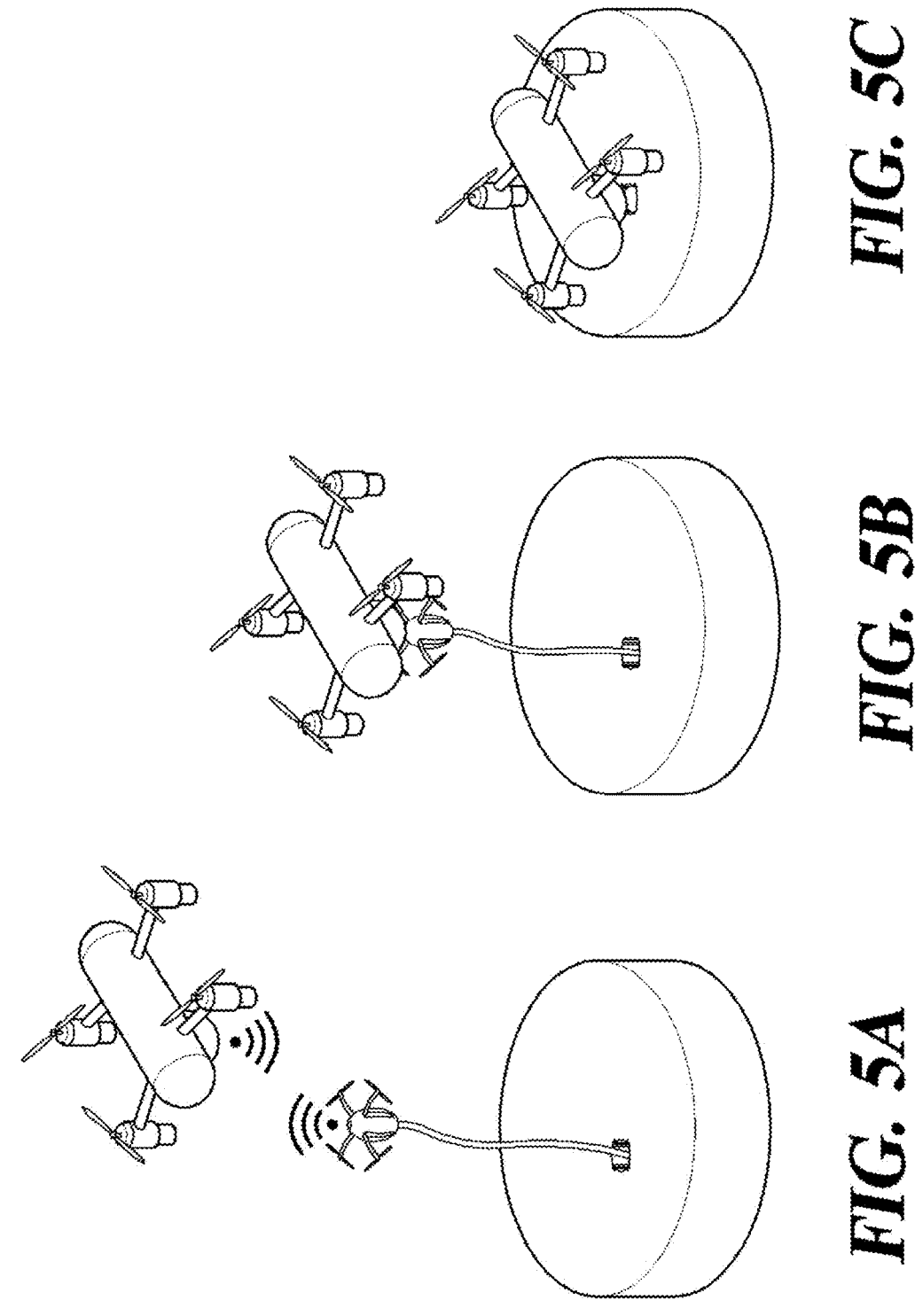
FIGS. 5A, 5B and 5C are diagrams illustrating a process in which the UAM aircraft lands vertically according to an embodiment of the present disclosure.

FIG. 5A corresponds to a state in which the UAM aircraft approaches the hub and attempts to land. The drone may form the UWB-based link with the UAM aircraft. The drone may check the ID and location of the UAM aircraft through the UWB. The drone may perform the UWB-based mutual security authentication with the UAM aircraft. The drone may move from the hub to the UAM aircraft.

FIG. 5B corresponds to a state in which the drone is coupled to the UAM aircraft to supply power required for landing the UAM aircraft. The drone may approach the UAM aircraft to attempt to dock. This docking may be precisely performed through the UWB-based mutual security authentication. After the drone is docked and coupled with the UAM aircraft, it may supply the UAM aircraft with power required for landing.

FIG. 5C corresponds to a state in which the UAM aircraft is coupled to the drone to land on the hub. The UAM aircraft may be supplied with power for landing from the drone and may land on the hub using this power. After the UAM aircraft lands on the hub, it may be supplied with power for later flights. The power may be supplied either rapidly or slowly.

Figure 6:
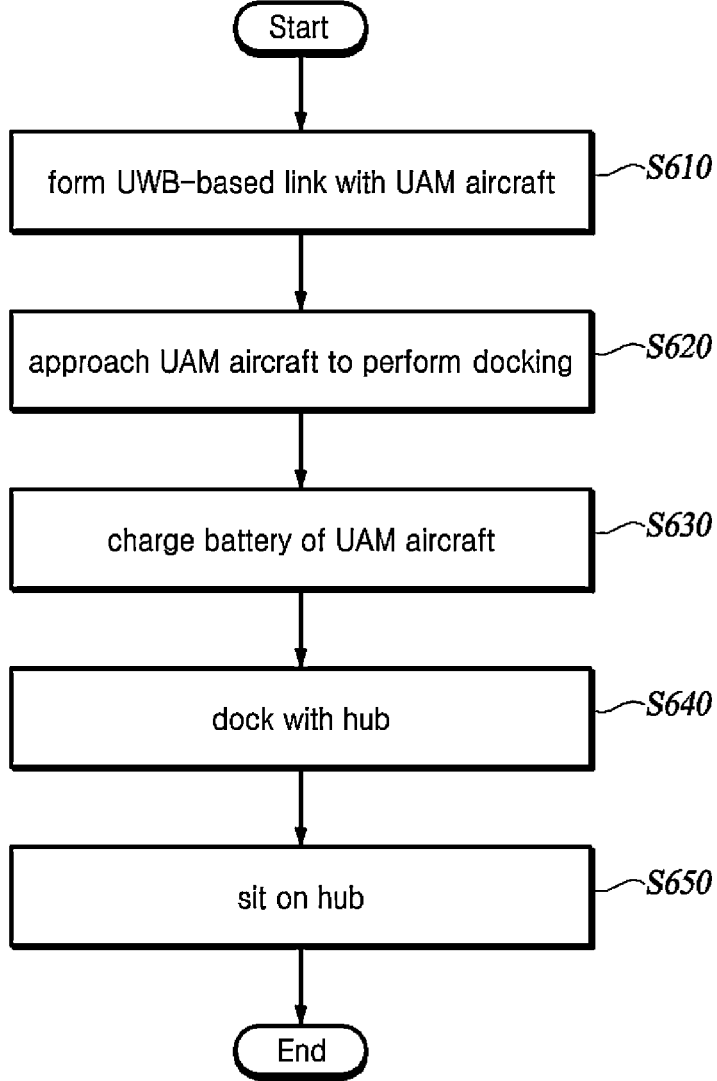
FIG. 6 is a flowchart illustrating a process in which the drone supplies power to the UAM aircraft while the UAM aircraft lands vertically according to an embodiment of the present disclosure.

FIG. 6 is a diagram illustrating a process in which the drone supplies power to the UAM aircraft while the UAM aircraft lands vertically according to an embodiment of the present disclosure.

Referring to FIG. 6, the hub may form the UWM-based link with the UAM aircraft. The hub may check the location of the UAM aircraft using the UWB. The hub may determine whether the UAM aircraft needs power for landing. When power supply is needed for landing the UAM aircraft, the drone may move from the hub to the UAM aircraft. The drone may form the UWM-based link with the UAM aircraft (S610) and approach the UAM aircraft to perform docking (S620). The drone may be coupled with the UAM aircraft to charge the battery of the UAM aircraft (S630). The drone may move to the hub while supplying power to the UAM aircraft. The drone may be docked with the hub (S640). The drone may be seated on the hub (S650). The drone may be installed in the cabin structure in the hub. The drone and the hub may form the UWB-based link so that the drone may check the location of the hub and accurately return to the hub using the location information.

FIG. 7 is a diagram illustrating a process in which the UAM aircraft takes off vertically according to an embodiment of the present disclosure.

Figures 7A, 7B, 7C:
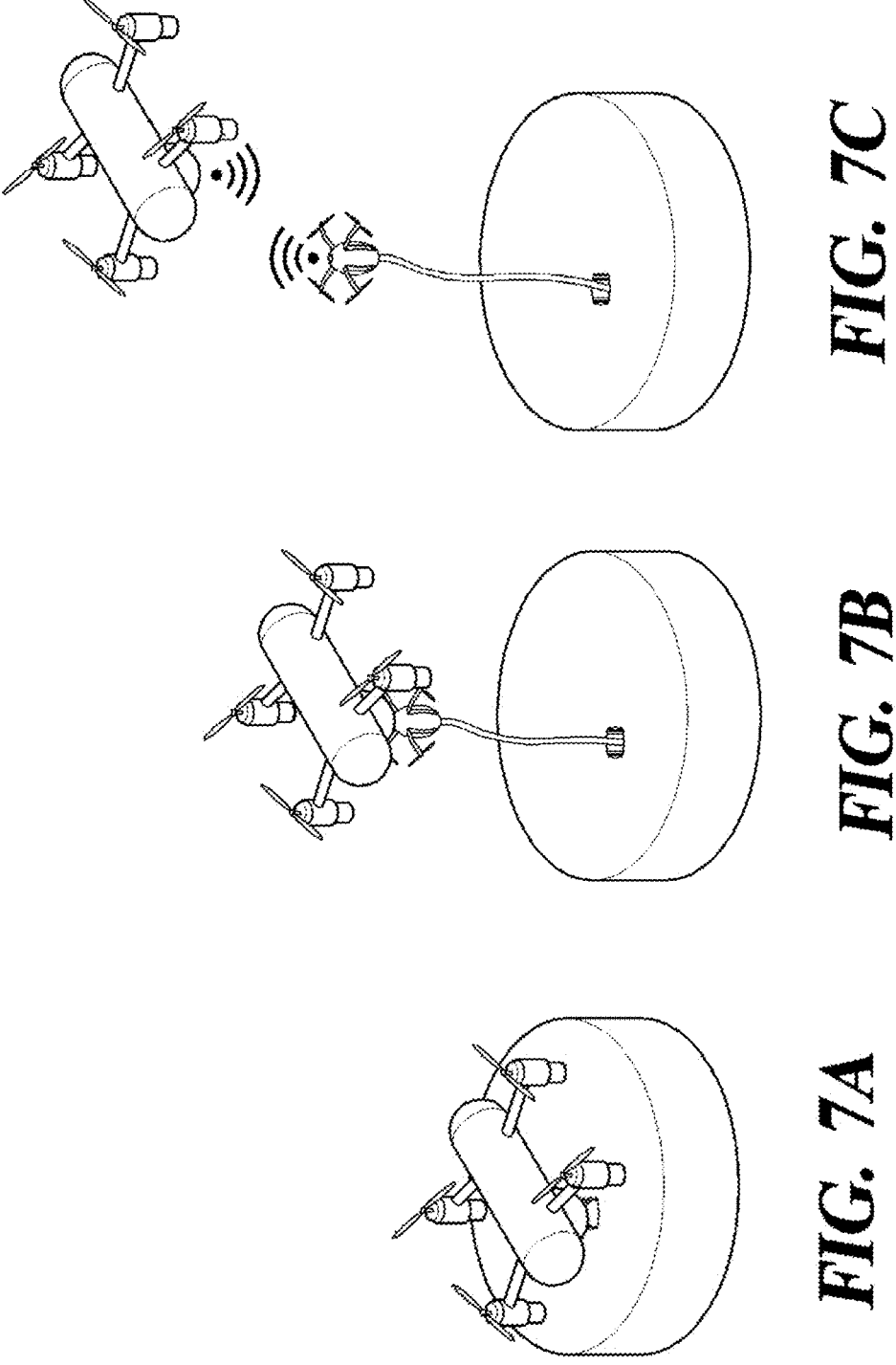
FIGS. 7A, 7B and 7C are diagrams illustrating a process in which the UAM aircraft takes off vertically according to an embodiment of the present disclosure.

FIG. 7A corresponds to a state in which the UAM aircraft stops at the hub. The UAM aircraft may be supplied with power for later flights in a state where it stops at the hub. The power may be supplied either rapidly or slowly.

FIG. 7B corresponds to a state in which the drone is coupled to the UAM aircraft and power required for the take-off of the UAM aircraft is supplied. The drone may be coupled to the UAM aircraft to supply power to the UAM aircraft. The UAM aircraft may be supplied with power required for the takeoff. The drone may be coupled with the UAM aircraft and move to a predetermined height along with the UAM aircraft while supplying power.

FIG. 7C corresponds to a state in which the drone is separated from the UAM aircraft to return to the hub. The drone may be separated from the UAM aircraft when the UAM aircraft reaches a predetermined height. The drone may accurately return to the hub using the UWB. The drone may be installed in the cabin structure inside the hub.

Figure 8:
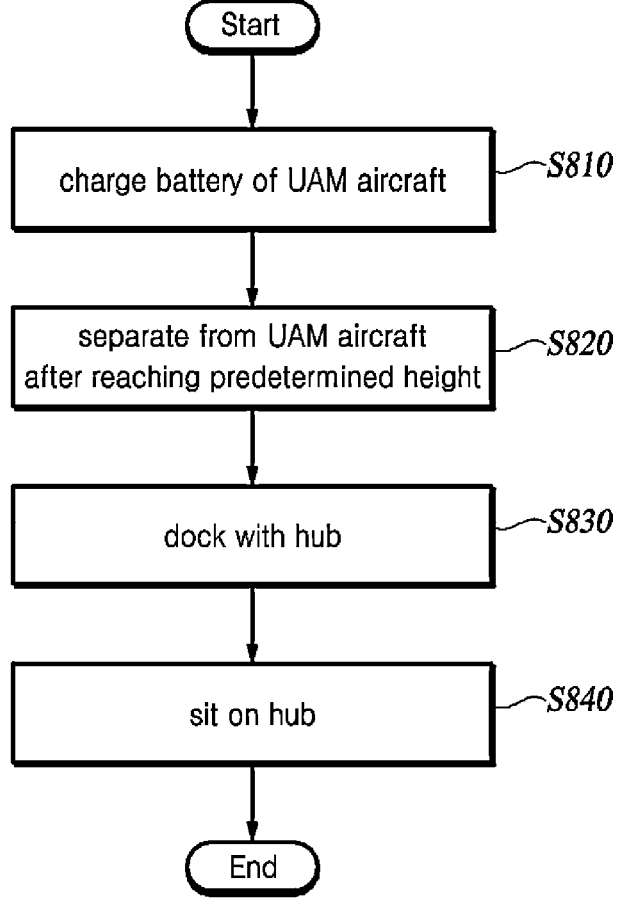
FIG. 8 is a flowchart illustrating a process in which the drone supplies power to the UAM aircraft while the UAM aircraft takes off vertically according to an embodiment of the present disclosure.

FIG. 8 is a diagram illustrating a process in which the drone supplies power to the UAM aircraft while the UAM aircraft takes off vertically according to an embodiment of the present disclosure.

Referring to FIG. 8, the drone may be coupled to the UAM aircraft to charge the battery of the UAM aircraft (S810). When the UAM aircraft moves up to a predetermined height, the drone may be separated from the UAM aircraft (S820). The drone and the hub may form the UWB-based link so that the drone may check the location of the hub using the UWB. The drone may move to the hub using the location of the hub, then dock with the hub (S830). The drone may be seated on the hub (S840), then be installed in a cabin structure in the hub.

Figure 9:
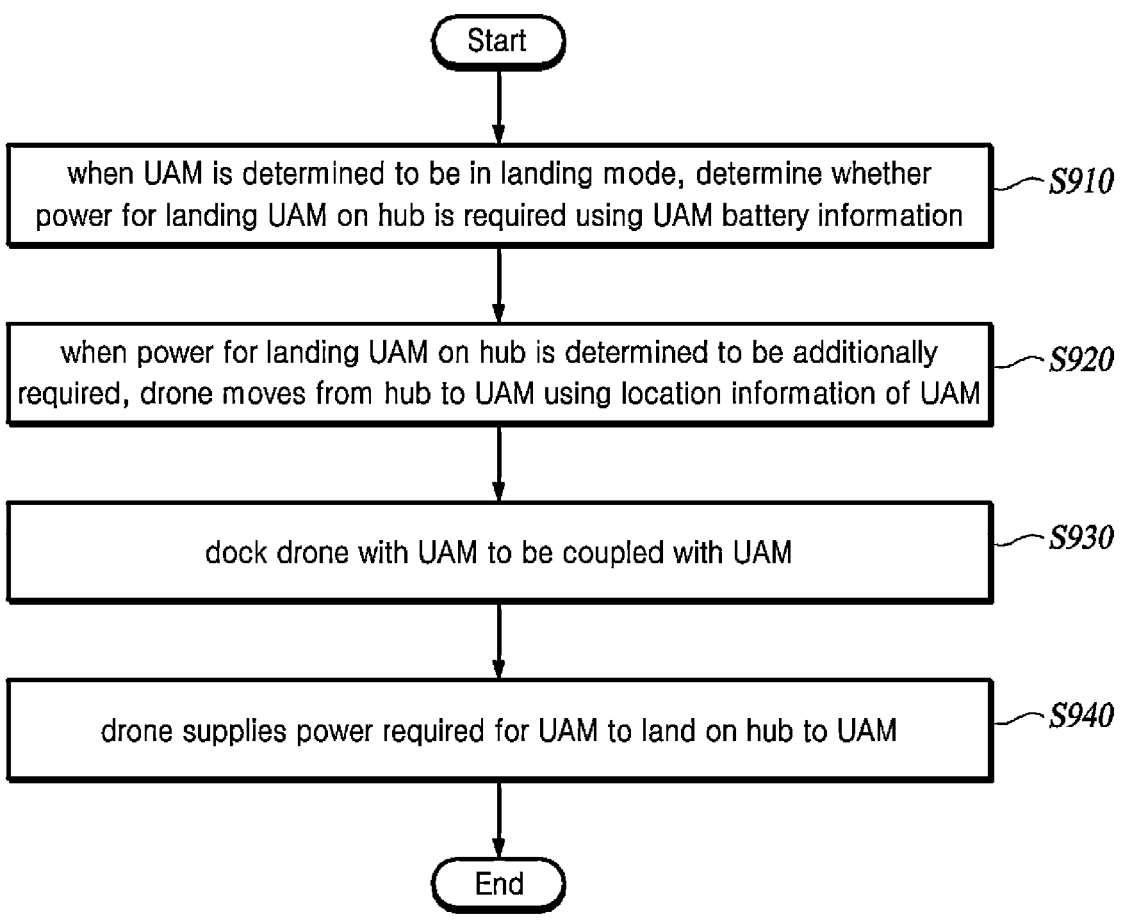
FIG. 9 is a flowchart illustrating a method in which a power supply system supplies power to an UAM aircraft while the UAM aircraft is landing according to an embodiment of the present disclosure.

FIG. 9 is a diagram illustrating a method in which a power supply system supplies power to the UAM vehicle while the UAM vehicle is landing according to an embodiment of the present disclosure. The term UAM aircraft and UAM vehicle may be used interchangeably with each other.

Referring to FIG. 9, the power supply system may include the drone and the hub. When the power supply system determines that the UAM vehicle is in the landing mode, it may be determined whether additional power for landing the UAM vehicle on the hub is required using the UAM vehicle battery information (S910). When it is determined that additional power for landing the UAM vehicle on the hub is required, the drone may move from the hub to the UAM vehicle using the location information of the UAM vehicle (S920). The drone may be docked to the UAM vehicle to be coupled with it (S930). The drone may supply power required for the UAM vehicle to land on the hub to the UAM vehicle (S940). The battery information of the UAM vehicle may be acquired by the UWB-based link formed between the hub and the UAM vehicle. The drone may be connected to the hub via the cable. The location information of the UAM vehicle may be acquired by the UWB-based link formed between the hub and the UAM vehicle and the UWB-based link formed between the drone and the UAM vehicle. The drone may move to the hub while being coupled to the UAM vehicle using the location information of the hub acquired based on the UWB-based link formed between the drone and the hub. Afterwards, the drone may be docked with the hub. When it is determined that the UAM vehicle requires charging, the drone may supply additional power to the UAM vehicle. The drone may be installed in a cabin structure in the hub.

The authentication of the UAM vehicle may be performed by the UWB-based link formed between the drone and the UAM vehicle. The battery information of the UAM vehicle may include at least one of SOH and SOC of the battery of the UAM vehicle. The drone may be moved by adjusting the tension of the cable, and the tension of the cable may be adjusted by the electric motor included in the hub. In order to make connecting easier, the charging terminal of the drone may have a circular shape, while the charging connector of the UAM vehicle may have a recessed shape. The hub may include a drain pipe for removing rainwater or foreign substances.

Figure 10:
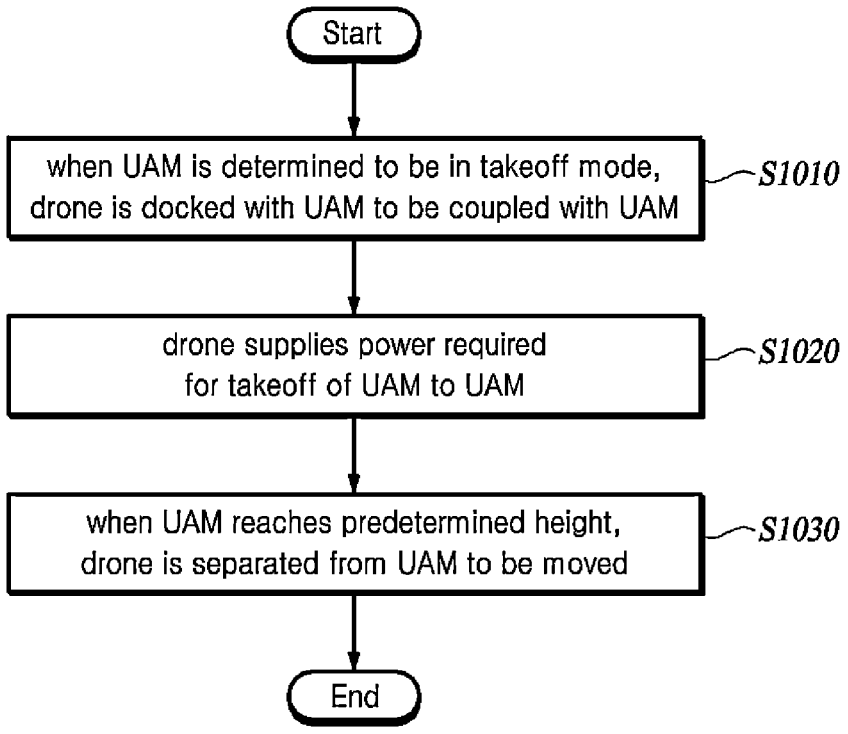
FIG. 10 is a flowchart illustrating a method in which the power supply system supplies power to the UAM aircraft while the UAM aircraft is taking off according to an embodiment of the present disclosure.

FIG. 10 is a flowchart illustrating a method in which the power supply system supplies power to the UAM vehicle while the UAM vehicle is taking off according to an embodiment of the present disclosure. The UAM aircraft and the UAM vehicle may be used interchangeably with each other.

Referring to FIG. 10, the power supply system may include the drone and the hub. If it is determined that the UAM vehicle is in the take-off mode, the drone may be docked to the UAM vehicle to couple with (S1010). The drone may supply power required for the take off of the UAM vehicle to the UAM vehicle (S1020). When the UAM vehicle reaches a predetermined height, the drone may be separated from the UAM vehicle and then be moved (S1030). The drone may then move to the hub using the location information of the hub. The drone may be docked with the hub. Afterwards, the drone may be installed in a cabin structure in the hub. The location information of the hub may be acquired based on the UWB-based link formed between the drone and the hub. The battery information of the UAM vehicle may be acquired based on the UWB-based link formed between the hub and the UAM vehicle. The drone may be connected to the hub via the cable. The authentication of the UAM vehicle may be performed by the UWB-based link formed between the drone and the UAM vehicle.

According to the present disclosure, it is possible to provide a method, apparatus, and system, in which a drone installed in a hub supplies power to an UAM aircraft while the UAM aircraft is taking off and landing.

Furthermore, according to the present disclosure, it is possible to provide a method, apparatus, and system, which increase the State of Health (SOH) and lifespan of an UAM aircraft battery.

Furthermore, according to the present disclosure, it is possible to provide a method, apparatus, and system, which increase the flight distance of an UAM aircraft.

Furthermore, according to the present disclosure, it is possible to provide a method, apparatus, and system, in which an UAM aircraft and a drone form an UWB-based link, thus preventing hacking.

Furthermore, according to the present disclosure, it is possible to provide a method, apparatus, and system, in which a charging cable mounted on a drone is extended or reduced by adjusting tension.

Furthermore, according to the present disclosure, it is possible to provide a method, apparatus, and system, which increase the durability of a hub through drainage treatment.

Furthermore, according to the present disclosure, it is possible to provide a method, apparatus, and system, in which the degree of freedom in angle or direction is high when a drone and an UAM aircraft are connected, thus allowing power to be stably supplied.

Effects that can be obtained by the present disclosure are not limited to the above-mentioned effects, and other effects which are not mentioned will be clearly understood by those having ordinary skill in the art from the following description.

Each element of the apparatus or method in accordance with the present disclosure may be implemented in hardware or software, or a combination of hardware and software. The functions of the respective elements may be implemented in software, and a microprocessor may be implemented to execute the software functions corresponding to the respective elements.

Various embodiments of systems and techniques described herein can be realized with digital electronic circuits, integrated circuits, field programmable gate arrays (FPGAs), application specific integrated circuits (ASICs), computer hardware, firmware, software, and/or combinations thereof. The various embodiments can include implementation with one or more computer programs that are executable on a programmable system. The programmable system includes at least one programmable processor, which may be a special purpose processor or a general purposed processor, coupled to receive and transmit data and instructions from and to a storage system, at least one input device, and at least one output device. Computer programs (also known as programs, software, software applications, or code) include instructions for a programmable processor and are stored in a "computer-readable recording medium."

The computer-readable recording medium may include all types of storage devices on which computer-readable data can be stored. The computer-readable recording medium may be a non-volatile or non-transitory medium such as a read-only memory (ROM), a compact disc ROM (CD-ROM), magnetic tape, a floppy disk, a memory card, a hard disk, or an optical data storage device. In addition, the computer-readable recording medium may further include a transitory medium such as a data transmission medium. Furthermore, the computer-readable recording medium may be distributed over computer systems connected through a network, and computer-readable program code can be stored and executed in a distributive manner.

Although operations are illustrated in the flowcharts/timing charts in this specification as being sequentially performed, this is merely an exemplary description of the technical idea of one embodiment of the present disclosure. In other words, those skilled in the art to which one embodiment of the present disclosure belongs may appreciate that various modifications and changes can be made without departing from essential features of an embodiment of the present disclosure, that is, the sequence illustrated in the flowcharts/timing charts can be changed and one or more operations of the operations can be performed in parallel. Thus, flowcharts/timing charts are not limited to the temporal order.

Although some embodiments of the present disclosure have been described for illustrative purposes, those having ordinary skill in the art should appreciate that various modifications, additions, and substitutions are possible, without departing from the idea and scope of the present disclosure. Therefore, the embodiments of the present disclosure have been described for the sake of brevity and clarity. The scope of the technical idea of the present embodiments is not limited by the illustrations. Accordingly, one of ordinary skill would understand that the scope of the claimed present disclosure is not to be limited by the above explicitly described embodiments but by the claims and equivalents thereof.

What is claimed is:

1. A power supplying method performed by a power supply system comprising a drone and a hub, the method comprising:

determining whether an Urban Air Mobility (UAM) vehicle requires power to land on the hub using battery information of the UAM vehicle when the UAM vehicle is determined to be in a landing mode;

moving the drone from the hub to the UAM vehicle using location information of the UAM vehicle based on a determination that the UAM vehicle requires additional power to land on the hub;

docking the drone to the UAM vehicle; and supplying power required for the UAM vehicle to land on the hub to the UAM vehicle by the drone, wherein the drone, the UAM vehicle and the hub each include one or more UWB sensors, wherein battery information of the UAM vehicle is acquired by an UWB-based link formed between the hub and the UAM vehicle, wherein the location information of the UAM vehicle is acquired by the UWB-based link formed between the hub and the UAM vehicle and a UWB-based link formed between the drone and the UAM vehicle, wherein the drone is connected to the hub via a cable, and wherein authentication of the UAM vehicle is performed by the UWB-based link formed between the drone and the UAM vehicle and an ID of the UAM vehicle obtained using the one or more UWB sensors included in the hub.

2. The method of claim 1, wherein the battery information of the UAM vehicle comprises at least one of State of Health (SOH) or State of Charge (SOC) of a battery of the UAM vehicle.

3. The method of claim 1, wherein the drone is moved by adjusting tension of the cable, and the tension of the cable is adjusted by an electric motor included in the hub.

4. The method of claim 1, wherein a charging terminal of the drone has a circular shape, and a charging connector of the UAM vehicle has a recessed shape.

5. The method of claim 1, wherein the hub comprises a drain pipe for removing rainwater or foreign substances.

6. The method of claim 1, further comprising:

moving the drone to the hub using location information of the hub in a state where the drone is coupled to the UAM vehicle; and docking the drone with the hub, wherein the location information of the hub is acquired based on the UWB-based link formed between the drone and the hub.

7. The method of claim 6, further comprising:

supplying the additional power to the UAM vehicle by the drone, based on that the UAM vehicle is determined to require charging.

8. A power supply system comprising a memory and a plurality of processors, wherein at least one processor of the plurality of processors is configured to:

determine whether power is required for an Urban Air Mobility (UAM) vehicle to land on a hub using battery information of the UAM vehicle when the UAM vehicle is determined to be in a landing mode;

move a drone from the hub to the UAM vehicle using location information of the UAM vehicle when it is determined that power is additionally required for the UAM vehicle to land on the hub;

dock the drone to the UAM vehicle to couple with; and supply power required for the UAM vehicle to land on the hub to the UAM vehicle by the drone, wherein the drone, the UAM vehicle and the hub each include one or more UWB sensors, wherein battery information of the UAM vehicle is acquired by an UWB-based link formed between the hub and the UAM vehicle, wherein the location information of the UAM vehicle is acquired by the UWB-based link formed between the hub and the UAM vehicle and a UWB-based link formed between the drone and the UAM vehicle, wherein the drone is connected to the hub via a cable, and wherein authentication of the UAM vehicle is performed by the UWB-based link formed between the drone and the UAM vehicle and an ID of the UAM vehicle obtained using the one or more UWB sensors included in the hub.

9. The system of claim 8, wherein the battery information of the UAM vehicle comprises at least one of State of Health (SOH) or State of Charge (SOC) of a battery of the UAM vehicle.

10. The system of claim 8, wherein the drone is moved by adjusting tension of the cable, and the tension of the cable is adjusted by an electric motor included in the hub.

11. The system of claim 8, wherein a charging terminal of the drone has a circular shape, and a charging connector of the UAM vehicle has a recessed shape.

12. The system of claim 8, wherein the hub comprises a drain pipe for removing rainwater or foreign substances.

13. The system of claim 8, wherein the at least one processor of the plurality of processors is further configured to:

move the drone to the hub using location information of the hub in a state where the drone is coupled to the UAM vehicle; and dock the drone with the hub, wherein the location information of the hub is acquired based on the UWB-based link formed between the drone and the hub.

14. The system of claim 13, wherein the drone supplies the additional power to the UAM vehicle based on that the UAM vehicle is determined to require charging.

* * * * *